US008793753B2

(12) United States Patent
Bhogal et al.

(10) Patent No.: US 8,793,753 B2
(45) Date of Patent: Jul. 29, 2014

(54) TRANSFERRING A BROADCAST TRANSMISSION TO A REMOTE DEVICE

(75) Inventors: Kulvir S. Bhogal, Pflugerville, TX (US); Gregory J. Boss, Saginaw, MI (US); John J. Gontkof, Mellbourne, FL (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/951,629

(22) Filed: Nov. 22, 2010

(65) Prior Publication Data

US 2012/0131631 A1    May 24, 2012

(51) Int. Cl.
*H04N 7/173* (2011.01)

(52) U.S. Cl.
USPC ........................................................ 725/118

(58) Field of Classification Search
USPC ............. 725/46, 60, 62, 94, 118, 153, 25, 38; 709/204; 715/862; 340/10.5; 345/2.3
See application file for complete search history.

(56) References Cited

U.S. PATENT DOCUMENTS

| 7,707,614 | B2 | 4/2010 | Krikorian et al. | |
|---|---|---|---|---|
| 2004/0070491 | A1* | 4/2004 | Huang et al. | 340/10.5 |
| 2005/0041952 | A1 | 2/2005 | Ko | |
| 2006/0051055 | A1 | 3/2006 | Ohkawa | |
| 2006/0150218 | A1 | 7/2006 | Lazar et al. | |
| 2006/0257123 | A1 | 11/2006 | Horozov et al. | |
| 2007/0067808 | A1* | 3/2007 | DaCosta | 725/62 |
| 2007/0294645 | A1* | 12/2007 | Medvinsky et al. | 715/862 |
| 2008/0282312 | A1 | 11/2008 | Blinnikka | |
| 2009/0125589 | A1* | 5/2009 | Anand et al. | 709/204 |
| 2009/0228765 | A1 | 9/2009 | Lee et al. | |
| 2011/0163939 | A1* | 7/2011 | Tam et al. | 345/2.3 |

OTHER PUBLICATIONS

"Opportunity and impact of video on LTW Networks", Motorola, Inc., copyright 2009, 19 pages.
"Digital Content and . . . ", http://frwebgate.access.gpo.gov/cgi-bin/getdoc.cgi?dbname=109_house_hearings&docid=f:29352.pdf, Committee on Energy & Commerce, House of Representatives, 137 pages.

* cited by examiner

*Primary Examiner* — Nasser Goodarzi
*Assistant Examiner* — An Nguyen
(74) *Attorney, Agent, or Firm* — Lisa Ulrich; Roberts Mlotkowski Safran & Cole, P.C.

(57) ABSTRACT

An approach is described that includes determining that a remote device has moved outside of a pre-defined area associated with a digital video recorder (DVR), and transmitting program data from the DVR to the remote device while the remote device remains outside of the pre-defined area. Another approach includes a digital video recorder (DVR) having a memory and a processor. The DVR operates to: receive an incoming transmission signal; transmit a selected program to a primary display device; determine that a remote device has moved outside of a pre-defined area; and transmit program data corresponding to the selected program to the remote device while the remote device remains outside of the pre-defined area.

22 Claims, 4 Drawing Sheets

TRANSFERRING A BROADCAST TRANSMISSION TO A REMOTE DEVICE

TECHNICAL FIELD

The present invention generally relates to broadcast transmission viewing, and more particularly, to a method and system for transferring a broadcast transmission to a remote device.

BACKGROUND

A digital video recorder (DVR), also called a personal video recorder (PVR), is a device that records video in a digital format to a disk drive or other medium. The term includes stand-alone set-top boxes and software for personal computers which enables video capture and playback to and from disk.

DVRs provide several enhancements relative to devices such as video cassette recorders (VCRs), including convenient time shifting of playback. Additionally, a DVR enables other enhanced playback modes such as pausing live television programming, instant replay of interesting scenes, chasing playback, scheduled recordings of programs, recording one or more programs while simultaneously viewing a different program, etc. Most DVRs use the MPEG format for encoding analog video signals. By saving the signals in a digital format, DVRs provide the ability to jump directly to a scene for playback, rather than rewinding and/or fast forwarding an analog tape as with VCRs.

DVRs may provide one or more enhanced playback modes. For example, time shifting is the recording of programming to a storage medium to be viewed or listened to at a time more convenient to the consumer. Chase play is a time shifting facility that allows a user to simultaneously watch, stop or pause live television while continuing to record a program to its conclusion. Instant replay is a feature enabling a user to quickly review recently rendered video. Pausing live television programming is a feature that enables a user to stop the video and display a still frame. Often, the user may resume the video at the point they paused.

Some DVRs are combined with (e.g., integrated into) a television service provider's set top box, and may include an Electronic Program Guide (EPG), Interactive Program Guide (IPG), or Electronic Service Guide (ESG). These guides are on-screen guides to scheduled broadcast television programs, allowing a viewer to navigate, select, and discover content by time, title, channel, genre, etc., by use of their remote control, a keyboard or even a phone keypad.

Present technology limits viewing to the television connected to the DVR or another computational device such as a personal computer, cellphone, or handheld device. To rewind and replay a specific missed scene or sports action, viewing on the primary screen is interrupted.

SUMMARY

In a first aspect of the invention, there is a method implemented in a computer infrastructure having computer executable code tangibly embodied on a computer readable storage medium having programming instructions operable to: determine that a remote device has moved outside of a pre-defined area associated with a digital video recorder (DVR); and transmit program data from the DVR to the remote device while the remote device remains outside of the pre-defined area.

In another aspect of the invention, there is a method that includes providing a computing infrastructure that operates to: receive an incoming transmission signal at a digital video recorder (DVR); transmit a selected program from the DVR to a primary display device; determine that a remote device has moved outside of a pre-defined area associated with one of the DVR and the primary display device; transmit program data from the DVR to the remote device while the remote device remains outside of the pre-defined area; and cease transmitting the program data to the remote device when the DVR determines that the remote device has moved back inside the pre-defined area. The program data transmitted to the remote device corresponds to the selected program that is transmitted to the primary display device. The determining that the remote device has moved outside of the pre-defined area comprises one of: transmitting a locating signal from the DVR to the remote device and awaiting a return signal from the remote device; and comparing GPS location data of the remote device to data defining the pre-defined area. The transmitting the program data from the DVR to the remote device comprises one of: transmitting the program data directly from the DVR to the remote device wirelessly; and transmitting the program data from the DVR to a wireless transmitter in a local area network (LAN) to which the DVR is connected.

In another aspect of the invention, a system comprises a digital video recorder (DVR) comprising a memory and a processor. The DVR operates to: receive an incoming transmission signal; transmit a selected program to a primary display device; determine that a remote device has moved outside of a pre-defined area; and transmit program data corresponding to the selected program to the remote device while the remote device remains outside of the pre-defined area.

In an additional aspect of the invention, a computer program product includes a computer usable storage medium having readable program code embodied in the medium. The computer program product includes at least one component operable to: receive an incoming transmission signal; transmit a selected program to a primary display device; determine that a remote device has moved outside of a pre-defined area; and transmit program data corresponding to the selected program to the remote device while the remote device remains outside of the pre-defined area.

In a further aspect of the invention, there is a computer system for controlling a digital video recorder (DVR). The system includes a CPU, a computer readable memory, and a computer readable storage media. The system also includes: first program instructions to receive an incoming transmission signal; second program instructions to transmit a selected program to a primary display device; third program instructions to determine that a remote device has moved outside of a pre-defined area; and fourth program instructions to transmit program data corresponding to the selected program to the remote device while the remote device remains outside of the pre-defined area. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to broadcast transmission viewing, and more particularly, to a method and system for transferring a broadcast transmission to a remote device. According to aspects of the invention, there is a system and method to enhance the functionality of a Digital Video Recorder (DVR) by using a remote device for playback that is location-aware by the DVR. In embodiments, the DVR determines the proximity of the remote device relative to the DVR and automatically transmits programming to the remote device when the remote device is outside a predefined range relative to the DVR. In embodiments, the remote device comprises a viewing screen and audio speaker(s), and can play the transmission from the DVR in real time (e.g., as it is received from the DVR) or alternatively can store the transmission for playback at a later time. In this manner, a user who leaves the proximity of the DVR can continue to view the programming using the remote device even though the user may be unable to see the primary display (e.g., television) to which the DVR is connected. Implementations of the invention thus provide a user the ability to continue viewing a program in real time even when that user leaves the vicinity of the DVR and primary display, and also permit users who remain within the vicinity of the primary display to continue watching the programming without having to pause and/or rewind the programming to accommodate the user that temporarily left the vicinity.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
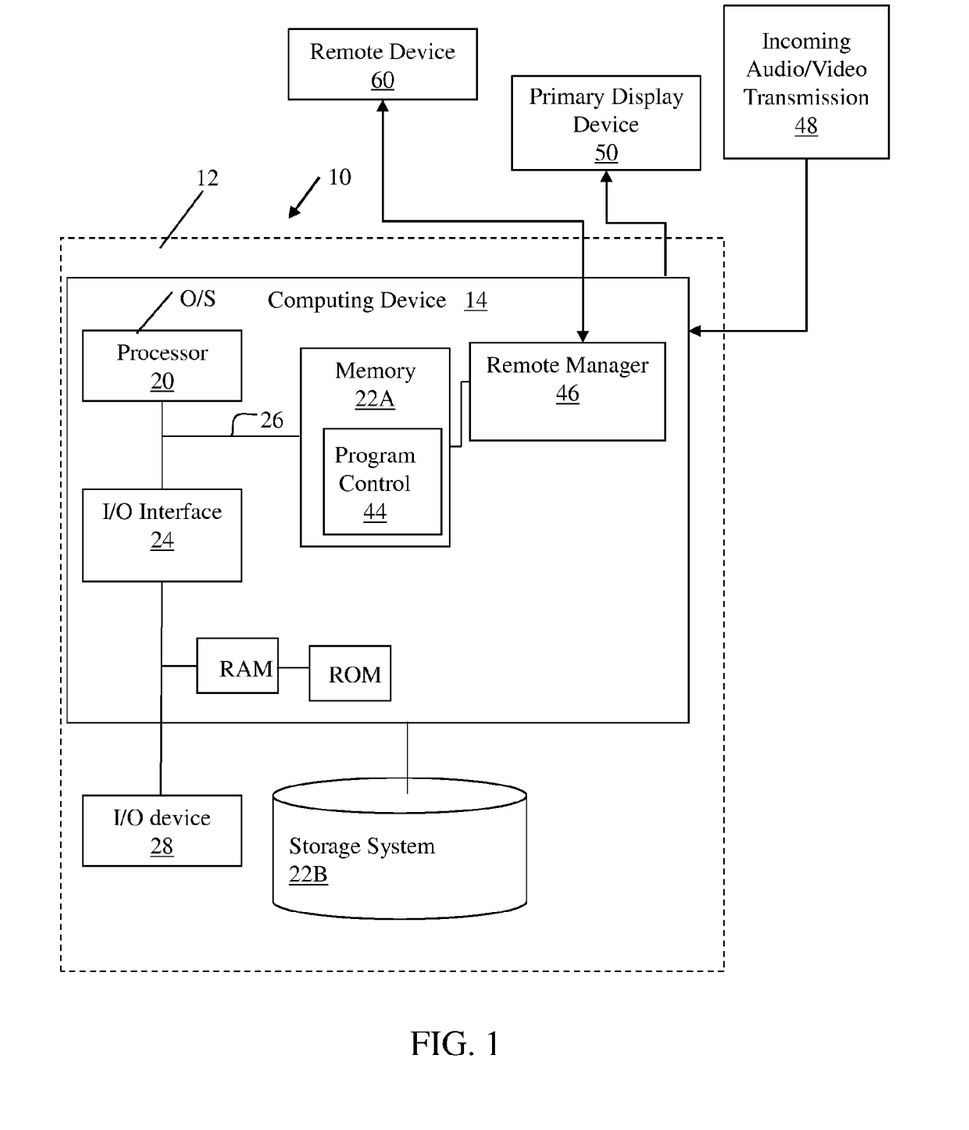
FIG. 1 is an illustrative environment for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a remote manager 46 that performs one or more of the processes described herein. The remote manager 46 can be implemented as one or more program code in the program control 44 stored in memory 22A as separate or combined modules. Additionally, the remote manager 46 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In accordance with aspects of the invention, the computing device 14 comprises a DVR that may operate to receive an audio/video transmission 48 (e.g., a television signal transmitted via cable, satellite, fiber optic, or other medium) and record the transmission in a digital format. The computing device 14 may further operate to transmit a signal to a primary display device 50, such as a television, personal computer, projector, etc., such that the audio/video transmission 48 received by the computing device 14 may be played on the primary display device 50. According to aspects of the invention, the remote manager 46 of the computing device 14 detects the proximity or location of at least one remote device 60 relative to the computing device 14. In embodiments, the remote device 60 comprises a computer device that is capable of displaying a program that is received from the computing device 14.

In embodiments, when the remote manager 46 determines that the remote device 60 is outside of a predefined range (e.g., distance) relative to the computing device 14 or other predefined area, the remote manager 46 causes the computing device 14 to begin transmitting data (e.g., the currently selected program in the DVR) to the remote device 60 for viewing and/or storage on the remote device 60. In this manner, a user who has left the vicinity of the computing device 14 may view the currently selected program on their remote device 60 rather than the primary display device 50. In embodiments, when the remote manager 46 determines that the remote device 60 has come back within range of the computing device 14, the remote manager 46 causes the computing device 14 to stop transmitting the data (e.g., program) to the remote device 60.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2A:
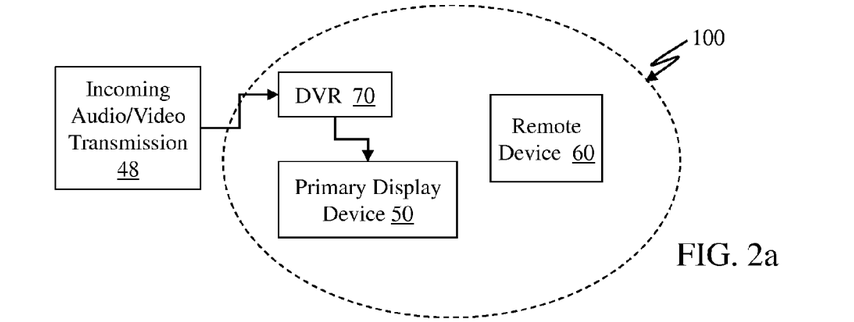
FIGS. 2a-2c show block diagrams depicting an exemplary implementation and operation of aspects of the invention.
Figure 2B:
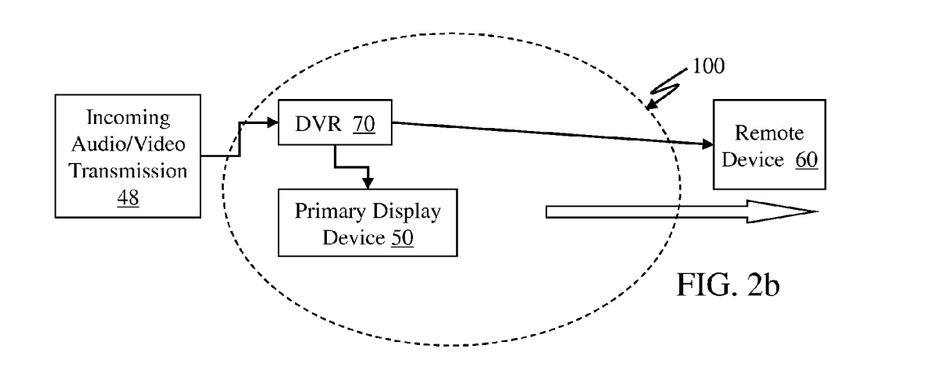
Figure 2C:
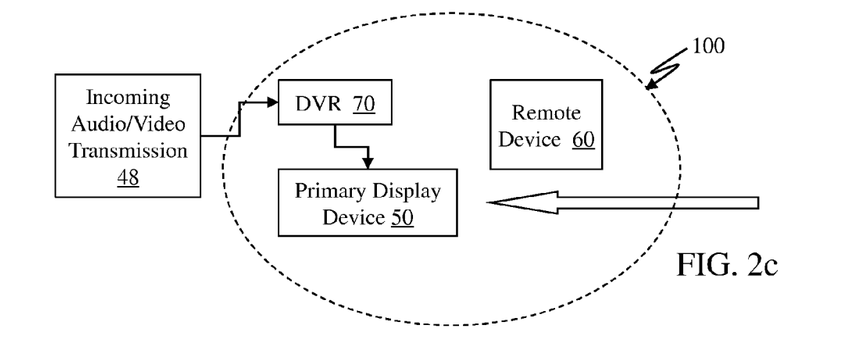

FIGS. 2a-2c show block diagrams depicting an exemplary implementation and operation of aspects of the invention. In particular, FIG. 2a shows a DVR 70 which may comprise the computing device 14 and which includes the remote manager 46 described above with respect to FIG. 1. The DVR 70 may receive an audio/video transmission 48 (e.g., a television signal transmitted via cable, satellite, fiber optic, or other medium), record the transmission 48 in a digital format, and decode, encode, or otherwise condition the transmission 48 for viewing on a primary display device 50. In embodiments, the DVR 70 may further be configured to perform time shifting of playback, pausing live television programming, instant replay, chasing playback, program guide, scheduled recordings, and/or any other known or later-developed conventional DVR functionality. The DVR 70 may be configured to operate with any desired resolution transmission, including high definition (HD), such as 1080i or 1080p, or greater or lesser resolutions.

In embodiments, the DVR 70 transmits a signal to a primary display device 50, such as a television, personal computer, projector, etc., such that the transmission 48 received by the DVR 70 may be played on the primary display device 50. For example, the DVR 70 may comprise a set-top box that receives a television signal from a service provider, and the primary display device 50 may comprise a television connected to the DVR by appropriate cables (e.g., coaxial cable, S-video, composite audio/video, component video (such as YPbPr, YCbCr, etc.), high definition multimedia interface (HDMI), digital visual interface (DVI), VGA, RGB, etc.). The invention is not limited to this example, however, and any desired primary display device 50 may be used with the DVR 70. Moreover, any desired communication technique (e.g., wired, wireless, etc.) may be used to transmit the signal from the DVR 70 to the primary display device 50.

In accordance with aspects of the invention, the DVR 70 determines (e.g., detects) the location of at least one remote device 60 relative to the DVR 70. In particular, the DVR 70 determines when the remote device 60 is within a predefined range (or boundary) 100 relative to the DVR 70 (or relative to the primary display device 50). When the remote device 60 is within the predefined range (or boundary) 100, as shown in FIG. 2a, the DVR 70 transmits a program signal to the primary display device 50 but not to the remote device 60. When the remote device 60 moves outside the predefined range (or boundary) 100, as shown in FIG. 2b, the DVR 70 begins transmitting a program signal to the remote device 60 (the DVR may or may not continue transmitting a program signal to the primary display device 50 in FIG. 2b). When the remote device 60 moves back into the predefined range (or boundary) 100, as shown in FIG. 2c, the DVR 70 stops transmitting the program signal to the remote device 60. In this manner, a user who leaves the vicinity of the primary display device 50 may continue to view the program on their remote device 60.

In embodiments, the determination that the remote device is inside or outside of a predefined range relative to the DVR 70 (or primary display device 50) may be performed using any suitable technique, such as by the DVR 70 transmitting a locating signal to the remote device 60 and waiting for a return signal from the remote device 60, similar to a ping or handshaking function between the DVR 70 and the remote device 60. Such a locating signal and return signal may be based on, for example, radio frequency identification (RFID), infrared, wireless radio transmission, etc.

For example, a passive RFID tag may be attached to, embedded within, or otherwise connected to the remote device 60. Additionally, an RFID reader configured for reading the passive RFID tag may be attached to, embedded within, or otherwise operatively connected to the DVR 70. In embodiments, the RFID reader generates (e.g., outputs) a locating signal that excites the passive RFID tag and causes the passive RFID tag to send a return signal when the passive RFID tag is within a predefined range of the RFID reader. When the passive RFID tag is outside of the predetermined range, however, the RFID reader does not receive a return signal from the passive RFID tag. As such, the RFID reader determines that the passive RFID tag is within a predefined range of the RFID reader when the RFID reader receives the return signal, and determines that the passive RFID tag is outside of the predefined range when the RFID reader does not receive the return signal.

In embodiments, by associating the RFID reader with the DVR 70 (or the primary display device 50) and the passive RFID tag with the remote device 60, this determination may be used by the remote manager 46 of the DVR 70 to determine when a remote device 60 is within or outside of the predefined range relative to the DVR 70 (or the primary display device 50). The range may be set to any desired range by appropriate configuration and design of the RFID reader and passive RFID tag. For example, the range may be set at about 20 feet, although any desired range may be used within the scope of the invention.

In another embodiment, an RFID reader may be placed at a particular location within a room relative to the DVR 70 (or the primary display device 50). For example, the RFID reader may be placed at or near a doorway (or other entrance to a room containing the primary display device 50) and used to detect when a passive RFID tag connected to the remote device 60 passes through the doorway. The RFID reader may be operatively connected to the DVR 70 to communicate any detections of the passive RFID tag. The DVR 70 may be programmed to interpret a first detection of the passive RFID tag by the RFID reader as the remote device 60 leaving the predefined area (e.g., going out of range), and to interpret the next detection of the passive RFID tag as the remote device returning to the predefined area (coming back into range).

The invention is not limited to the use of passive RFID. For example, active RFID may be used to provide real-time tracking of the exact location of the remote device 60 relative to the DVR 70 (or relative to the primary display device 50).

The invention is not limited to RFID. In other embodiments, the DVR 70 may be configured to generate and output an infrared or wireless radio locating signal. When the remote device 60 receives the infrared or wireless radio signal, the remote device 60 transmits a return signal to the DVR 70. The return signal may also be infrared or wireless radio. In this manner, the DVR 70 determines that the remote device 60 is within a predefined range when the DVR 70 receives the return signal from the remote device 60, and the DVR 70 determines that the remote device 60 is outside of the predetermined range when the DVR 70 does not receive the return signal from the remote device 60. The range of the infrared signal may be defined by line-of-sight between the DVR 70 and the remote device 60, and also by the strength of the infrared transmitters used by each of the DVR 70 and the remote device 60. The range of a wireless radio signal may be independent of line-of-sight and may be based on the strength of the transmitters. Any desired wireless radio transmission technique may be used for communication directly between the DVR 70 and the remote device 60, such as an IEEE 802.15 signal or any other suitable wireless radio transmission technique.

In even further embodiments, the remote device 60 may be provided with GPS (global positioning system) hardware and/or software that permits the location of the remote device to be determined using GPS techniques. In this manner, the DVR 70 may be provided with the GPS location of the remote device 60, e.g., via WAN or LAN. The predefined range in this case may be an area that is defined by GPS coordinates and stored in the DVR 70. For example, the area may be defined to coincide with a room in which the primary display device 50 is located. When the DVR 70 receives the GPS location of the remote device 60, the remote manager 46 determines whether the GPS location of the remote device 60 is within the area or outside of the area by comparing the GPS location to the stored data defining the area. In this manner, any desired predefined area of any size and any shape may be programmed and stored in the DVR 70 and used by the remote manager 46 for determining the relative location of the remote device 60.

Although particular examples have been described for determining a location of the remote device relative to the DVR 70 (e.g., RFID, infrared, wireless radio, GPS), the invention is not limited to these examples, and any suitable system may be used for determining when the remote device 60 is within or outside of a predefined range of the DVR 70 (or the primary display device 50). Also, as described herein, the predefined range may be set to any suitable size and/or shape by appropriately selecting and configuring the technology used for making the determination.

According to aspects of the invention, the DVR 70 begins transmitting program data to the remote device 60 when the DVR 70 determines that the remote device 60 is outside of the predefined range. The transmission of program data from the DVR 70 to the remote device 60 may be performed in any desired manner including, but not limited to, local wireless communication directly from the computing device 14 to the remote device 60, in a LAN (local area network) implementation such as wired or wireless communication from the computing device 14 to a router and from the router wirelessly to the remote device 60, or via a wide area network (WAN) implementation such as the Internet.

Figure 3A:
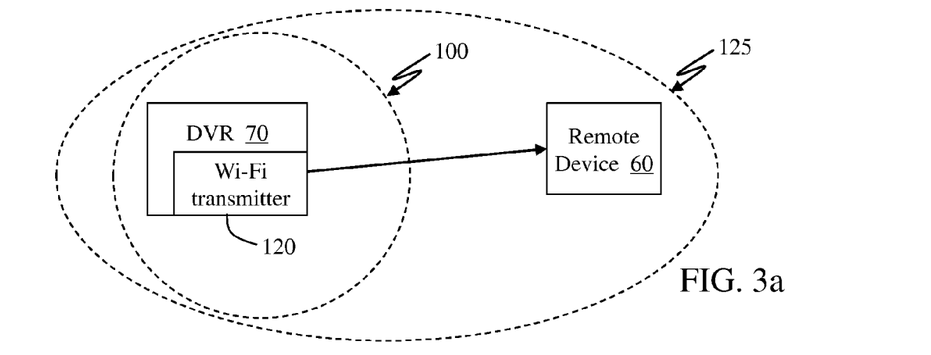
FIGS. 3a-3c show block diagrams depicting an exemplary implementation and operation of aspects of the invention.
Figure 3B:
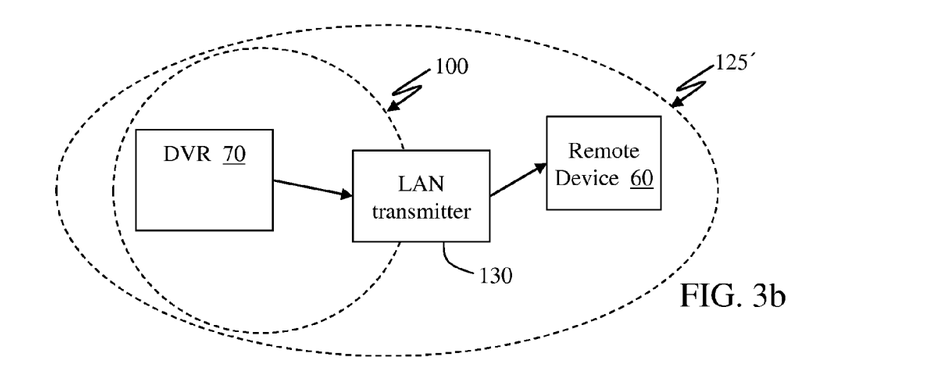
Figure 3C:
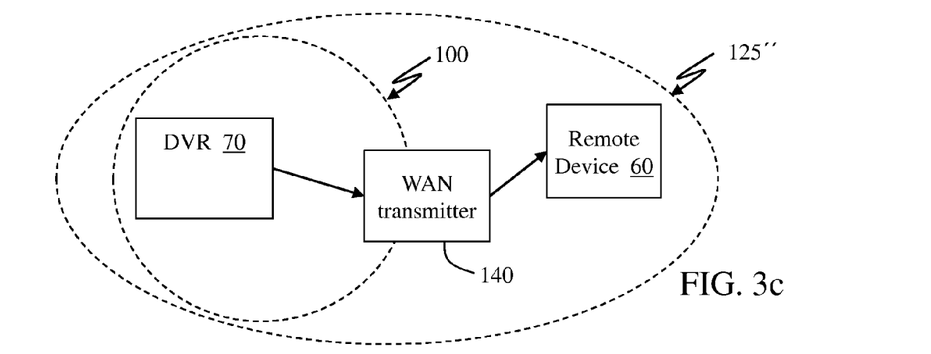

For example, as shown in FIG. 3*a*, the DVR 70 may comprise a Wi-Fi (e.g., IEEE 802.11) transmitter 120 that permits the DVR 70 to transmit data wirelessly to an area 125that is larger than the predefined range 100. Additionally or alternatively, as depicted in FIG. 3*b*, the DVR 70 may be wired or wirelessly connected to a LAN, and the LAN may comprise a transmitter 130 (such as a wireless router) that receives data from the DVR 70 and wirelessly transmits the data (e.g., using Wi-Fi) to an area 125' larger than the predefined range 100. Additionally or alternatively, as depicted in FIG. 3*c*, the DVR 70 may be wired or wirelessly connected to a WAN, such as the Internet, and the WAN may comprise a transmitter 140 that receives data from the DVR 70 and wirelessly transmits the data (e.g., via 3G cellular or 4G cellular) to an area 125" larger than the predefined range 100. The invention is not limited to these examples, however, and any desired techniques may be used to transmit the program data from the DVR 70 to the remote device 60 when the remote device 60 is outside of the predefined range.

In embodiments, the program data that is transmitted from the DVR 70 to the remote device 60 comprises data that may be received by the remote device 60 and used by the remote device 60 for displaying the program that is currently selected on the DVR 70. In this manner, the remote device 60 may be used to display (or store in memory for later display) the same program as is currently being displayed on the primary display device 50 when the remote device 60 is outside of the predefined range.

In accordance with aspects of the invention, the remote device 60 comprises a computing device that is configured to receive and play the program data (e.g., a portion of a television show) that is transmitted from the DVR 70. The remote device 60 may comprise any general purpose computing device, such as a smart phone, personal digital assistant, netbook computer, tablet computer, etc., that is capable of performing the functions described herein. Alternatively, the remote device 60 may comprise a hand-held viewer designed specifically for use with the DVR 70 in accordance with aspects of the invention. In any event, the remote device 60 comprises a screen capable of playing video, a data storage system (e.g., persistent or volatile memory), a processor, speakers and/or a headphone jack, and network communication capability (e.g., wired and/or wireless). The storage (e.g., memory) can be of any desired size, and preferably is of sufficient size to contain a useable duration of programming. One or more audio speakers may be incorporated into the remote device 60 for playing an audio portion of the program data. One or more headphone jacks may be included in the remote device 60 to permit replay without disturbing other people in the vicinity of the remote device.

In embodiments, the remote device 60 includes a component for interacting with the DVR 70 to permit the DVR 70 to determine whether the remote device is within or outside of the predefined range, as described with respect to FIGS. 2*a-c*. For example, the remote device 60 may comprise at least one of: an RFID tag, an infrared receiver and transmitter, a local wireless radio receiver and transmitter, and a GPS system.

According to further aspects of the invention, the remote device 60 may store and execute software that enables a user to control the playback of the program data on the remote device 60. The software may provide functions for DVR-style control of the program data including, but not limited to, play, pause, stop, fast forward, rewind, and delete. The functions may be presented to a user and controlled with a touch screen interface, e.g., on the display screen of the remote device 60. Additionally or alternatively, the functions may be controlled using physical buttons and/or keys comprised in the remote device 60. In even further embodiments, the software programming of the remote device 60 prompts a user to store or delete the portion of program data after they have viewed it on the remote device 60, thereby permitting the user to watch the transferred recordings again or freeing storage space for additional recordings.

As described herein, the DVR 70 begins transmitting the currently selected program to the remote device 60 when the DVR 70 detects that the remote device 60 has left the predefined range, and the DVR 70 continues transmitting to the remote device 60 until the DVR 70 detects that the remote device 60 has re-entered the predefined range. In embodiments, the DVR 70 automatically initiates transmission of the program data to the remote device 60 at the point in the selected program when the remote device 60 leaves the predefined area, without the user having to request that the program data transmission begin. In particular embodiments, the program data is transmitted directly from the DVR 70 to the remote device 60, or from the DVR 70 to the remote device 60 via only a wireless router in a LAN. As further described herein, the remote device 60 has viewing, storing, and playback functionality similar to a DVR. In this manner, a user who has left the vicinity of the DVR 70 (or primary display device 50) may use the remote device 60 to watch and control the television program (or other program) to which the DVR 70 is currently tuned, while other users may continue to watch the program on the primary display device 50. Accordingly, implementations of the invention permit a user to leave the vicinity of the primary display device 50 and continue watching the selected program without interrupting the users who remain in the vicinity of the primary display device 50.

Although aspects of the invention have been described thus far with respect to a single remote device 60, the DVR 70 may be configured to perform the functions described herein with a plurality of remote devices 60. For example, the DVR 70 may detect the location of a plurality of remote devices 60 in the manner described herein by using unique identifiers (e.g., unique RFID tags, unique infrared signal, etc.) for each respective remote device 60. In embodiments, when a first remote device 60 leaves the predefined range while a second remote device 60 stays within the predefined range, the DVR 70 may transmit the program data to the first remote device 60 without transmitting the program data to the second remote device 60.

In embodiments, when more than one remote device 60 leaves the predefined range, the DVR 70 may independently transmit program data to each respective remote device 60. For example, the first remote device 60 may leave the predefined range at a first time and the second remote device 60 may leave the predefined range at a second time different from the first time. In such circumstances, the DVR 70 separately transmits program data to each respective remote device 60 based on when each remote device 60 left the predefined range. In this manner, each user of a respective remote device 60 may be provided with the ability to leave the predefined range and continue viewing the selected program independent of the other remote devices 60.

In an even further embodiment, when all of the plurality of remote devices 60 leaves the predefined range, the DVR 70 pauses the broadcast to the primary display device 50. The DVR 70 resumes play to the primary display device 50 when at least one of the plurality of remote devices 60 returns to the predefined range.

Aspects of the invention have been described thus far with respect to determining when a user leaves the vicinity of the DVR 70 by determining when the remote device 60 leaves the vicinity of the DVR 70. The invention is not limited to detecting the remote device 60, however, and the DVR 70 may alternatively determine that a user has left the vicinity of the DVR 70 by detecting a third device that is separate from the remote device 60. For example, a third device that is separate from the remote device may comprise the at least one of: an RFID tag, an infrared receiver and transmitter, a local wireless radio receiver and transmitter, and a GPS system. In embodiments, the system stores an association between the third device and the remote device 60. When the DVR 70 determines that the third device is within or outside of the predefined range (e.g., as described with respect to FIGS. 2a-c), the DVR 70 automatically begins transmitting the program data to the remote device 60. In this manner, the use need not carry their remote device 60 away from the DVR 70 to begin the automatic transmission of program data to the remote device 60. The third device may be any suitable device comprising at least one of: an RFID tag, an infrared receiver and transmitter, a local wireless radio receiver and transmitter, and a GPS system. In an exemplary implementation, the third device comprises a key fob comprising an RFID tag.

Flow Diagram

Figure 4:
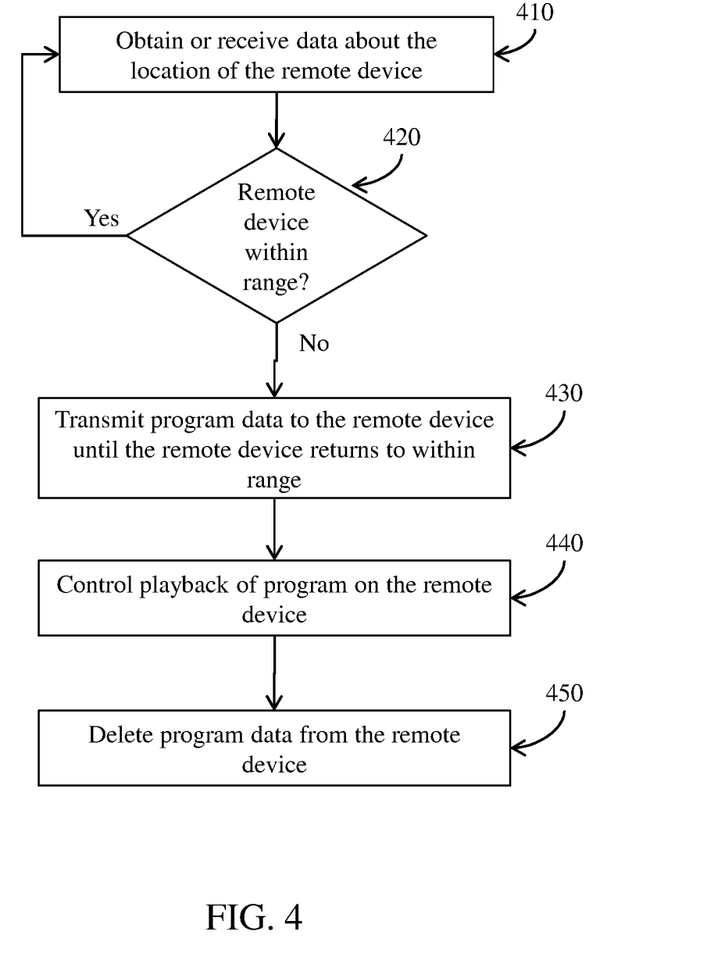
FIG. 4 shows an exemplary flow in accordance with aspects of the invention.

FIG. 4 shows an exemplary flow for performing aspects of the present invention. The steps of FIG. 4 may be implemented in the environment of FIGS. 1-3, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 4 depicts an exemplary flow for a process in accordance with aspects of the present invention. At step 410, a DVR (e.g., DVR 70) uses an application (e.g., remote manager 46) to obtain or receive data that is used for determining whether a remote device (e.g., remote device 60) is inside or outside of a predefined range. In embodiments, this may comprise any of: the DVR transmitting an RFID signal to an RFID tag associated with the remote device and waiting for a return signal; the DVR receiving a signal from an RFID reader located at location such as a doorway or entrance to a room; the DVR transmitting an infrared signal to the remote device and waiting for a return signal; the DVR transmitting a local wireless radio signal to a the remote device and waiting for a return signal; and the DVR obtaining or receiving GPS data associated with the remote device.

At step 420, the DVR uses the data from step 410 to determine whether the remote device is inside or outside of the predefined range. This may be accomplished as described above with respect to FIGS. 2a-c. For example, the DVR may determine that the remote device is within the predefined range when the DVR receives a return signal from the remote device, and the DVR may determine that the remote device is outside the predefined range when the DVR does not receive a return signal from the remote device. Alternatively, when GPS is used, step 420 may comprise the DVR comparing GPS data of the remote device to stored data defining the predefined range to determine whether the remote device is within the predefined range.

When the DVR determines at step 420 that the remote device is within the predefined range, the process returns to step 410 and repeats. The steps 410 and 420 may be repeated at any desired frequency, using any desired time interval between pings sent out by the DVR to the remote device.

On the other hand, when the DVR determines at step 420 that the remote device is outside of the predefined range, then at step 430 the DVR begins transmitting program data to the remote device. This may be performed as described above with respect to FIGS. 3a-c. The DVR continues transmitting the program data to the remote device at step 430 until such time as the DVR detects that the remote device has returned to the predefined range.

At step 440, the user controls playing of the program on the remote device. This may comprise, for example, real-time viewing of the program on the remote device as the program data is received from the DVR. This may also comprise at least one of pausing, rewinding, fast forwarding, time-shifted playback, etc. In embodiments, the program data is streamed to the remote device from the DVR for real-time viewing such that the program data need not be stored in persistent memory on the remote device. In other embodiments, the program data is stored in persistent memory of the remote device, and the user may control playback of the stored program using at least one of play, pause, rewind, fast forward, time-shifted playback, etc.

At step 450, the program data is removed (e.g., deleted) from the storage media on the remote device. In this manner, the storage media can be re-used for storing subsequent program data received from the DVR.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   determine that a remote device has moved outside of a pre-defined area associated with a digital video recorder (DVR), wherein the determining is performed by the DVR;
   transmit program data from the DVR to the remote device while the remote device remains outside of the pre-defined area;
   determine that another device has moved outside the pre-defined area; and
   transmit the program data from the DVR to the other device while the other device is outside the pre-defined area and the remote device is inside the pre-defined area, wherein the remote device has not left the pre-defined area while the other device has moved outside the pre-defined area;
   determine that the other device has returned to the pre-defined area; and
   cease the transmission of the program data to the other device based on determining that the other device has returned to the pre-defined area; and
   determine that a user has left the pre-defined area based on the another device having left the pre-defined area while the remote device is within the pre-defined area, wherein:
   the DVR stores a relationship between the another device and the remote device;
   the other device is at least one of a RFID tag, a key fob, an infrared receiver and transmitter, and a local wireless radio receiver and transmitter; and
   the program data is streamed to the remote device for real-time viewing without storing the program data in the remote device.

2. The method of claim 1, wherein the program data correspond to a program that is currently selected by the DVR.

3. The method of claim 1, further comprising transmitting other data to a primary display device for display on the primary display device, wherein the transmitting the program data to the remote device occurs simultaneously with the transmitting the other data to the primary display device.

4. The method of claim 1, further comprising:
   determining that the remote device has returned to the pre-defined area; and
   ceasing the transmitting the program data to the remote device based on the determining that the remote device has returned to the pre-defined area.

5. The method of claim 1, wherein the pre-defined area is a pre-defined range relative to the DVR.

6. The method of claim 1, wherein the pre-defined area is a pre-defined range relative to a primary display device that receives a transmission for the DVR for playing a program selected on the DVR.

7. (The method of claim 1, wherein:
   the determining that the remote device has moved outside of the pre-defined area comprises transmitting an RFID signal from the DVR to an RFID tag associated with the remote device; and
   the DVR determines one of: the remote device is within the pre-defined area when the DVR receives a return signal from the RFID tag; and the remote device is outside of the pre-defined area when the DVR does not receive a return signal from the RFID tag.

8. The method of claim 1, wherein:
   the determining that the remote device has moved outside of the pre-defined area comprises transmitting an infrared or wireless radio signal from the DVR to the remote device; and
   the DVR determines one of: the remote device is within the pre-defined area when the DVR receives a return infrared or wireless radio signal from the remote device; the remote device is outside of the pre-defined area when the DVR does not receive a return infrared or wireless radio signal from the remote device.

9. The method of claim 1, wherein:
   the determining that the remote device has moved outside of the pre-defined area comprises obtaining or receiving GPS data defining a GPS location of the remote device;
   the DVR determines one of: the remote device is within the pre-defined area when the GPS location of the remote device is within a boundary defining the pre-defined area; and
   the remote device is outside of the pre-defined area when the GPS location of the remote device is outside the boundary defining the pre-defined area.

10. The method of claim 1, wherein the transmitting the program data from the DVR to the remote device comprises one of:

transmitting the program data directly from the DVR to the remote device wirelessly;

transmitting the program data from the DVR to a LAN transmitter, and transmitting the data wirelessly from the LAN transmitter to the remote device; and transmitting the program data from the DVR to a WAN transmitter, and transmitting the data wirelessly from the WAN transmitter to the remote device.

11. The method of claim 1, wherein a service provider at least one of creates, maintains, deploys and supports the computer infrastructure.

12. The method of claim 1, wherein steps of claim 1 are provided by the service provider on a subscription, advertising, and/or fee basis.

13. The method of claim 1, wherein the remote device leaves the pre-defined area at a first time and the another remote device leaves the pre-defined area at a second time, and the method further comprises determining to transmit the program data to the remote device and the another remote device based on when the remote device and the another remote device left the pre-defined area, wherein a user of the remote device can leave the pre- defined area and continue to view the program data independent of the another remote device.

14. A method, comprising:
providing a computing infrastructure that operates to:
receive an incoming transmission signal at a digital video recorder (DVR);
transmit a selected program from the DVR to a primary display device;
determine that a remote device has moved outside of a pre-defined area associated with one of the DVR and the primary display device, wherein the determining is performed by the DVR;
transmit program data from the DVR to the remote device while the remote device remains outside of the pre-defined area; and
cease transmitting the program data to the remote device when the DVR determines that the remote device has moved back inside the pre-defined area;
determine that another device has moved outside the pre-defined area; and
transmit the program data from the DVR to the other device while the other device is outside the pre-defined area and the remote device is inside the pre-defined area, wherein the remote device has not left the pre-defined area while the other device has moved outside the pre-defined area;
determine that the other device has returned to the pre-defined area;
cease the transmission of the program data to the other device based on determining that the other device has returned to the pre-defined area; and
determine that a user has left the pre-defined area based on the another device having left the pre-defined area while the remote device is within the pre-defined area, wherein:
the DVR stores a relationship between the another device and the remote device;
the other device is at least one of a RFID tag, a key fob, an infrared receiver and transmitter, and a local wireless radio receiver and transmitter; and
the program data is streamed to the remote device for real-time viewing without storing the program data in the remote device;

the program data transmitted to the remote device corresponds to the selected program that is transmitted to the primary display device;

the determining that the remote device has moved outside of the pre-defined area comprises one of: transmitting a locating signal from the DVR to the remote device and awaiting a return signal from the remote device; and comparing GPS location data of the remote device to data defining the pre-defined area; and the transmitting the program data from the DVR to the remote device comprises one of: transmitting the program data directly from the DVR to the remote device wirelessly; and transmitting the program data from the DVR to a wireless transmitter in a local area network (LAN) to which the DVR is connected.

15. A system, comprising:
a digital video recorder (DVR) comprising a memory and a processor, wherein the DVR operates to:
receive an incoming transmission signal;
transmit a selected program to a primary display device;
determine that a remote device has moved outside of a pre-defined area;
transmit program data corresponding to the selected program to the remote device while the remote device remains outside of the pre-defined area;
determine that the remote device has moved into the pre-defined area based on receiving a message from the remote device;
transmit the program data to the primary display device;
determine that another device has moved outside the pre-defined area;
transmit the program data from the DVR to the other device while the other device is outside the pre-defined area and the remote device is inside the pre-defined area, wherein the remote device has not left the pre-defined area while the other device has moved outside the pre-defined area;
determine that the other device has returned to the pre-defined area:
cease the transmission of the program data to the other device based on determining that the other device has returned to the pre-defined area; and
determine that a user has left the pre-defined area based on the another device having left the pre-defined area while the remote device is within the pre-defined area, wherein:
the DVR stores a relationship between the another device and the remote device;
the other device is at least one of a RFID tag, a key fob, an infrared receiver and transmitter, and a local wireless radio receiver and transmitter; and
the program data is streamed to the remote device for real-time viewing without storing the program data in the remote device.

16. The system of claim 15, wherein the DVR stops transmitting the program data to the remote device when the DVR determines that the remote device has moved back inside the pre-defined area.

17. The system of claim 15, wherein the DVR transmits the program data to the remote device by one of:
directly from the DVR to the remote device;
through a wireless router in a local m'ea network (LAN) to which the DVR is connected; through a wide area network (WAN).

18. The system of claim 15, wherein the system further comprises the remote device, and the remote device comprises:

a video display; and at least one audio speaker or headphone output jack.

19. The system of claim 18, wherein the remote device operates to:
   receive the program data from the DVR;
      store the program data in a buffer;
      control viewing of the program data on the video display including at least one of:
   play, pause, rewind, fast forward, stop, and delete.

20. The system of claim 18, wherein:
   the DVR comprises a component that transmits a locating signal to the remote device; and
   the remote device comprises component that transmits a return signal to the DVR upon receipt of the locating signal from the DVR.

21. A computer program product comprising a computer usable storage memory having readable program code embodied in the storage memory, the computer program product includes at least one component operable to:
   receive an incoming transmission signal;
   transmit a selected program to a primary display device;
   determine that a remote device has moved outside of a pre-defined area;
   transmit program data corresponding to the selected program to the remote device while the remote device remains outside of the pre-defined area;
   determine that the remote device has moved into the pre-defined area and another device has moved outside the pre-defined area;
   transmit the program data to the remote device while the remote device remains inside the pre-defined area;
   determine that a user has left the pre-defined area based on the another device having left the pre-defined area while the remote device is within the pre-defined area wherein:
   the DVR stores a relationship between the another device and the remote device;
   the another device is at least one of a RFID tag, a key fob, an infrared receiver and transmitter, and a local wireless radio receiver and transmitter; and
   the program data is streamed to the remote device for real-time viewing without storing the program data in the remote device.

22. A computer system for controlling a digital video recorder (DVR), the system comprising:
   a CPU, a computer readable memory, and a computer readable storage medium;
   first program instructions to receive an incoming transmission signal;
   second program instructions to transmit a selected program to a primary display device;
   third program instructions, to determine that a remote device has moved outside of a pre-defined area, wherein the determining is performed by the DVR; and
   fourth program instructions to transmit program data corresponding to the selected program to the remote device while the remote device remains outside of the pre-defined area;
   fifth program instructions to determine that a user has left the pre-defined area based on the another device having left the pre-defined area while the remote device is within the pre- defined area, wherein;
   the DVR stores a relationship between the another device and the remote device;
   the another device is at least one of a RFID tag, a key fob. an infrared receiver and transmitter, and a local wireless radio receiver and transmitter;
   the program data is streamed to the remote device for real-time viewing without storing the program data in the remote device; and
   the first, second, third, fourth, and fifth program instructions are stored on the computer readable storage medium for execution by the CPU via the computer readable memory.

* * * * *